US00RE50097E

(19) United States
(12) Reissued Patent
Kobayashi et al.

(10) Patent Number: US RE50,097 E
(45) Date of Reissued Patent: Aug. 27, 2024

(54) IMAGE FORMING APPARATUS INCLUDING CARTRIDGE HAVING FIRST STORAGE CHAMBER, CARTRIDGE ATTACHMENT PORTION HAVING SECOND STORAGE CHAMBER, AND RECORDING PORTION

(71) Applicant: BROTHER KOGYO KABUSHIKI KAISHA, Nagoya (JP)

(72) Inventors: Akihito Kobayashi, Konan (JP); Akinari Ishibe, Okazaki (JP); Yuma Tanabe, Nagoya (JP); Masahiro Hayashi, Nagoya (JP); Masatake Sato, Nagoya (JP)

(73) Assignee: BROTHER KOGYO KABUSHIKI KAISHA, Aichi (JP)

(21) Appl. No.: 17/490,062

(22) Filed: Sep. 30, 2021

Related U.S. Patent Documents

Reissue of:
(64) Patent No.: 10,850,523
Issued: Dec. 1, 2020
Appl. No.: 16/212,844
Filed: Dec. 7, 2018

U.S. Applications:
(63) Continuation of application No. 15/663,960, filed on Jul. 31, 2017, now Pat. No. 10,160,219.

(30) Foreign Application Priority Data

Dec. 28, 2016 (JP) ..... 2016-256031

(51) Int. Cl.
*B41J 2/175* (2006.01)
*B41J 2/19* (2006.01)
(Continued)

(52) U.S. Cl.
CPC ..... *B41J 2/1752* (2013.01); *B41J 2/17503* (2013.01); *B41J 2/17513* (2013.01);
(Continued)

(58) Field of Classification Search
CPC ..... B41J 2/17513; B41J 2/17523; B41J 2/17503; B41J 2/19; B41J 2/1753; B41J 2/1752; B41J 29/38; B41J 29/13
See application file for complete search history.

(56) References Cited

U.S. PATENT DOCUMENTS 5,270,739 A 12/1993 Kitani et al.
6,193,363 B1 2/2001 Kelly
(Continued)

FOREIGN PATENT DOCUMENTS

AP 1 053 881 A1 11/2000
CA 1274649 A 11/2000
(Continued)

OTHER PUBLICATIONS

Hearing Notice issued in corresponding Indian Patent Application No. 202017008113, Feb. 1, 2023.
(Continued)

*Primary Examiner* — Elizabeth L McKane
(74) *Attorney, Agent, or Firm* — Merchant & Gould P.C.

(57) ABSTRACT

For an image forming apparatus including first and second storage chambers, an inequality expression of "R2>A×R1" is met. R1 is a sum of a passage resistance value obtained by flowing air through a first air communication portion and a passage resistance value obtained by flowing liquid through a supply portion. R2 is a passage resistance value obtained by flowing air through a second air communication portion. A is a cross-sectional area ratio obtained by dividing a first average cross-sectional area of a first space of the first storage chamber taken along a plurality of horizontal planes by a second average cross-sectional area of a second space of the second storage chamber taken along the plurality of horizontal planes. The first space contains at least a portion adjacent to the supply portion and accumulating the liquid.
(Continued)

The second space contains at least a portion accumulating the liquid.

9 Claims, 8 Drawing Sheets

(51) Int. Cl.
*B41J 29/13* (2006.01)
*B41J 29/38* (2006.01)

(52) U.S. Cl.
CPC ..... *B41J 2/17523* (2013.01); *B41J 2/1753* (2013.01); *B41J 2/19* (2013.01); *B41J 29/13* (2013.01); *B41J 29/38* (2013.01)

(56) References Cited

U.S. PATENT DOCUMENTS

| | | | | |
|---|---|---|---|---|
| 6,719,415 | B1 | 4/2004 | Hattori et al. | |
| 9,150,011 | B1 * | 10/2015 | Tomoguchi | B41J 2/19 |
| 10,160,219 | B2 * | 12/2018 | Kobayashi | B41J 2/19 |
| 2002/0167571 | A1 * | 11/2002 | Hayashi | B41J 2/17503 347/85 |
| 2005/0179752 | A1 | 8/2005 | Ishizawa et al. | |
| 2006/0250425 | A1 | 11/2006 | Nambudiri et al. | |
| 2007/0252878 | A1 | 11/2007 | Yokoyama et al. | |
| 2009/0002433 | A1 | 1/2009 | Shimizu et al. | |
| 2009/0201351 | A1 | 8/2009 | Shimizu et al. | B41J 2/17509 347/87 |
| 2011/0134184 | A1 | 6/2011 | Katoh et al. | |
| 2012/0062659 | A1 | 3/2012 | Tsubaki | |
| 2012/0249692 | A1 * | 10/2012 | Kanbe | B41J 2/175 347/86 |
| 2013/0050358 | A1 | 2/2013 | Kanbe et al. | |
| 2015/0224779 | A1 * | 8/2015 | Okazaki | B41J 2/1752 347/86 |
| 2015/0375512 | A1 | 12/2015 | Kondo et al. | B41J 2/17553 347/86 |
| 2017/0050444 | A1 | 2/2017 | Urakami et al. | |

FOREIGN PATENT DOCUMENTS

| | | | |
|---|---|---|---|
| CN | 1274649 | A | 11/2000 |
| CN | 1647931 | A | 8/2005 |
| CN | 101062618 | A | 10/2007 |
| CN | 105313478 | A | 2/2016 |
| CN | 105984207 | A | 10/2016 |
| EP | 0 496 620 | A1 | 7/1992 |
| EP | 496 620 | A1 | 7/1992 |
| EP | 1 053 881 | A1 | 11/2000 |
| EP | 3 156 236 | A1 | 4/2017 |
| JP | 9-104117 | A | 4/1997 |
| JP | 10-119313 | A | 5/1998 |
| JP | 2005-161637 | A | 6/2005 |
| JP | 2008-238792 | A | 10/2008 |
| JP | 2010-006074 | A | 1/2010 |
| WO | 2013/030900 | A1 | 3/2013 |
| WO | 2015/190201 | A1 | 12/2015 |

OTHER PUBLICATIONS

International Search Report and Written Opinion issued in related international application PCT/JP2017/027586, mailed Sep. 12, 2017.
Extended European Search Report issued in related European Patent Application No. 17184063.0, Jan. 23, 2018.
International Preliminary Report on Patentability issued in corresponding International Patent Application No. PCT/JP2017/027586, Feb. 13, 2020.
Examination Report issued in corresponding Indian Patent Application No. 202017008113, Feb. 1, 2023.
Hearing Notice issued in corresponding Indian Patent Application No. 202017008113, Aug. 8, 2023.
Examination Report issued in corresponding Indian Patent Application No. 202017008113, Feb. 1, 2021.
Hearing Notice issued in corresponding Indian Patent Application No. 202017008113, Mar. 13, 2023.
Office Action issued in corresponding Chinese Patent Application No. 201710652193.2, Sep. 15, 2020.

* cited by examiner

IMAGE FORMING APPARATUS INCLUDING CARTRIDGE HAVING FIRST STORAGE CHAMBER, CARTRIDGE ATTACHMENT PORTION HAVING SECOND STORAGE CHAMBER, AND RECORDING PORTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application *is a reissue of U.S. Pat. No. 10,850,523, which* is a continuation of U.S. patent application Ser. No. 15/663,960 filed Jul. 31, 2017, which further claims priority from Japanese Patent Application No. 2016-256031 filed Dec. 28, 2016. The entire contents of [both] *all of the above* applications [is] *are* incorporated herein by reference.

TECHNICAL FIELD

The present disclosure relates to an image forming apparatus including a cartridge having a first storage chamber, and a cartridge attachment portion having a second storage chamber.

BACKGROUND

Japanese Patent Application Publication No. 2008-238792 discloses a liquid ejecting device including a device body, and an ink cartridge. The device body includes a liquid ejection head and a subordinate tank. The ink cartridge has a liquid storage chamber and is adapted to be attached to and detached from the device body. The liquid storage chamber of the ink cartridge is provided with a sensor arm pivotally moved if the liquid level of the ink stored in the liquid storage chamber becomes equal to or lower than a predetermined level. The device body is provided with a sensor for detecting residual amount of ink. The sensor generates detection signals different from each other dependent on pivot position of the sensor arm. A controller of the liquid ejecting device determines residual amount of ink remaining in the liquid storage chamber of the ink cartridge on the basis of the detection signal outputted from the sensor. Further, annunciation is made to notify the user of the replacement of the ink cartridge with a new ink cartridge if the ink in the liquid storage chamber of the ink cartridge is consumed and the controller determines that the residual amount of ink is equal to or lower than the predetermined amount.

SUMMARY

Ink in the liquid storage chamber of the ink cartridge flows into the subordinate tank in response to the outflow of the ink from the subordinate tank. The liquid level of the ink in the subordinate tank is eventually equal to the liquid level of the ink in the liquid storage chamber of the ink cartridge, in case where the subordinate tank and the liquid storage chamber are open to an atmosphere. Here, ink flow-out amount from the subordinate tank may be equal to ink flow-out amount from the liquid storage chamber in accordance with the ink ejection at the recording head, assuming that the passage resistance is ignored. However, the lowering speed of the liquid level of the ink in the subordinate tank is different from the lowering speed of the liquid level of the ink in the liquid storage chamber due to difference in shape between the subordinate tank and the liquid storage chamber. Thus, the liquid level of the ink in the subordinate tank becomes different from the liquid level of the ink in the liquid storage chamber.

For example, assuming that the controller counts the number of ink droplet ejected from the recording head to compute consumed amount of ink, after the controller determines that the residual amount of ink is equal to or lower than the predetermined amount on the basis of the detection signal outputted from the sensor for detecting residual amount of ink. The ink amount actually remaining in the subordinate tank and the liquid storage chamber is regarded as a quantity determination reference value of the ink, immediately after the controller determines that the residual amount of ink is equal to or lower than the predetermined amount in a situation where the liquid level of the ink in the subordinate tank is equal to the liquid level of the ink in the liquid storage chamber of the ink cartridge. Thus, the ink amount actually remaining in the subordinate tank and the liquid storage chamber is different from the quantity determination reference value of the ink, immediately after the controller determines that the residual amount of ink is equal to or lower than the predetermined amount in a situation where the liquid level of the ink in the subordinate tank is different from the liquid level of the ink in the liquid storage chamber of the ink cartridge.

As a result, the ink in the subordinate tank and the liquid storage chamber runs out and air may be entered into the recording head before the controller alerts the necessity of exchanging the ink cartridge, if the residual amount of the ink is smaller than the quantity determination reference value. Reversely, the controller alerts the necessity of exchanging the ink cartridge irrespective of the fact that the usable amount of ink still remains in the subordinate tank or the liquid storage chamber, if the residual amount of the ink is greater than the quantity determination reference value.

In view of the foregoing, it is an object of the disclosure to provide an image forming apparatus including a cartridge having a first storage chamber, and a cartridge attachment portion having a second storage chamber, the apparatus being capable of restraining air entry into a recording portion from the second storage chamber.

In order to attain the above and other objects, the present disclosure provides an image forming apparatus that includes: a cartridge; a cartridge attachment portion; and a recording portion. The cartridge includes: a first storage chamber; a first air communication portion; and a supply portion. The first storage chamber is configured to store a liquid. The first air communication portion allows the first storage chamber to be communicated with an atmosphere. The supply portion is configured to supply the liquid stored in the first storage chamber. The cartridge attachment portion includes: a connecting portion; and a tank. The connecting portion is connectable to the supply portion. The tank includes: a liquid flow-in port; a second storage chamber; a second air communication portion; and a liquid flow-out port. The liquid flow-in port allows the liquid stored in the first storage chamber and flowing through the connecting portion connected to the supply portion to pass through the liquid flow-in port. The second storage chamber is configured to store the liquid passed through the liquid flow-in port. The second air communication portion allows the second storage chamber to be communicated with the atmosphere. The liquid flow-out port is disposed at a position below the liquid flow-in port and allows the liquid stored in the storage chamber to flow out of the second storage chamber. The recording portion includes a nozzle. The liquid flowed out of the second storage chamber through the liquid flow-out port is ejected through the nozzle. An inequality expression of "R2>A×R1" is met, in which R1: a first passage resistance value which is a sum of a passage resistance value obtained by flowing air through the first air communication portion and a passage resistance value obtained by flowing liquid through the supply portion; R2: a second passage resistance value obtained by flowing air through the second air communication portion; and A: a cross-sectional area ratio obtained by dividing a first average cross-sectional area by a second average cross-sectional area, the first average cross-sectional area being an average cross-sectional area of a first space of the first storage chamber taken along a plurality of horizontal planes, the first space containing at least a portion adjacent to the supply portion and accumulating the liquid; and the second average cross-sectional area being an average cross-sectional area of a second space of the second storage chamber taken along the plurality of horizontal planes, the second space containing at least a portion accumulating the liquid.

According to another aspect, the present disclosure provides an image forming system includes: a cartridge; and an image forming apparatus. The cartridge includes: a first storage chamber; a first air communication portion; and a supply portion. The first storage chamber is configured to store a liquid. The first air communication portion allows the first storage chamber to be communicated with an atmosphere. The supply portion is configured to supply the liquid stored in the first storage chamber. The image forming apparatus includes: a cartridge attachment portion; and a recording portion. The cartridge attachment portion includes: a connecting portion; and a tank. The connecting portion is connectable to the supply portion. The tank includes: a liquid flow-in port; a second storage chamber; a second air communication portion; and a liquid flow-out port. The liquid flow-in port allows the liquid stored in the first storage chamber and flowing through the connecting portion connected to the supply portion to pass through the liquid flow-in port. The second storage chamber is configured to store the liquid passed through the liquid flow-in port. The second air communication portion allows the second storage chamber to be communicated with the atmosphere. The liquid flow-out port is disposed at a position below the liquid flow-in port and allows the liquid stored in the storage chamber to flow out of the second storage chamber. The recording portion includes a nozzle. The liquid flowed out of the second storage chamber through the liquid flow-out port is ejected through the nozzle. An inequality expression of "R2>A×R1" is met, in which R1: a first passage resistance value which is a sum of a passage resistance value obtained by flowing air through the first air communication portion and a passage resistance value obtained by flowing liquid through the supply portion; R2: a second passage resistance value obtained by flowing air through the second air communication portion; and A: a cross-sectional area ratio obtained by dividing a first average cross-sectional area by a second average cross-sectional area, the first average cross-sectional area being an average cross-sectional area of a first space of the first storage chamber taken along a plurality of horizontal planes, the first space containing at least a portion adjacent to the supply portion and accumulating the liquid; and the second average cross-sectional area being an average cross-sectional area of a second space of the second storage chamber taken along the plurality of horizontal planes, the second space containing at least a portion accumulating the liquid.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1A:
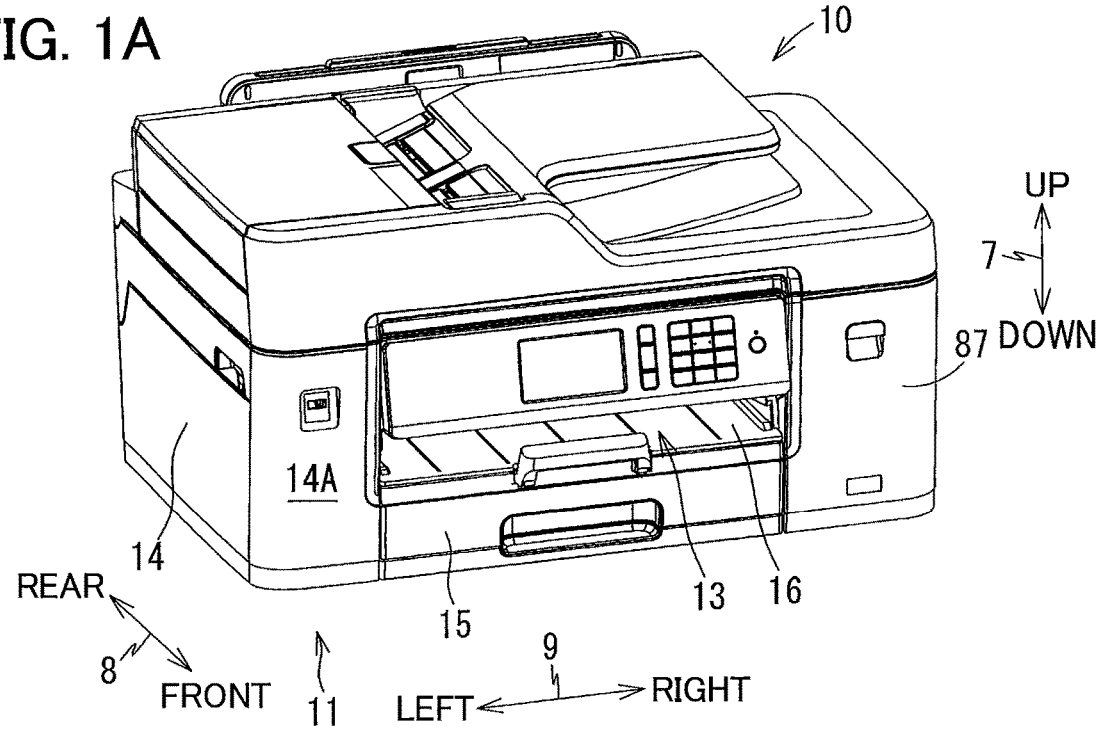
FIG. 1A is a perspective view of a multifunction peripheral as an example of an image forming apparatus according to one embodiment, and illustrating a closed position of a cover.

Hereinafter, one embodiment of the disclosure will be described in detail while referring to the accompanying drawings wherein like parts and components are designated by the same reference numerals to avoid duplicating description. While the description will be made in detail with reference to specific embodiment, it would be apparent those skilled in the art that the embodiment described below is merely an example of the present disclosure and various changes and modifications may be made thereto without departing from the scope of the disclosure.

In the following description, an up-down direction 7 is defined with reference to the posture (posture illustrated in FIG. 1A, which is referred to as "usage posture") of a multifunction peripheral 10 according to the embodiment disposed on a horizontal plane in a usable state. A front-rear direction 8 is defined assuming a surface formed with an opening 13 as a front surface of the multifunction peripheral 10. A left-right direction 9 is a direction between the left and the right when a user views the multifunction peripheral 10 from its front side. In the present embodiment, the up-down direction 7 is parallel to the vertical direction and the front-rear direction 8 and the left-right direction 9 are parallel to the horizontal direction in a state where the multifunction peripheral 10 is in the usage posture. Further, the front-rear direction 8 is perpendicular to the left-right direction 9.

[Overall Configuration of Multifunction Peripheral 10]

Figure 1B:
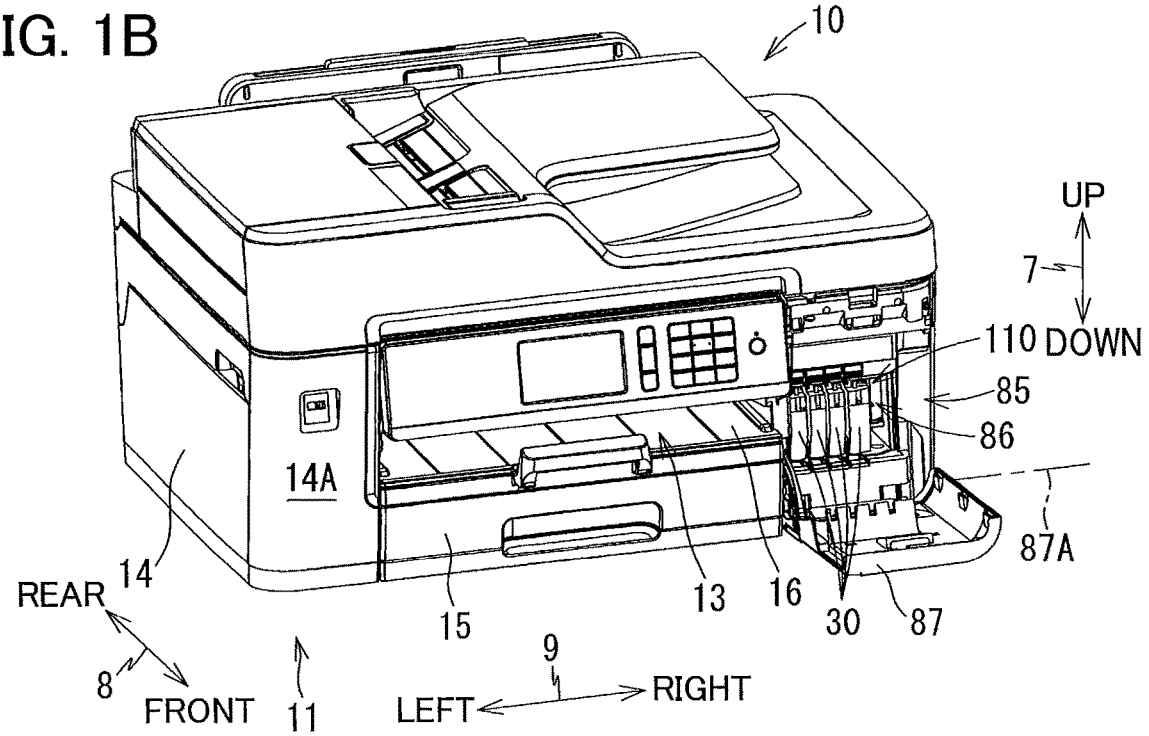
FIG. 1B is a perspective view of the multifunction peripheral as the example of the image forming apparatus according to the embodiment, and illustrating an open position of the cover.

As illustrated in FIGS. 1A and 1B, the multifunction peripheral 10 (an example of an image forming apparatus) has a substantially rectangular parallelepiped shape. The multifunction peripheral 10 has a printer portion 11 at its lower portion. The printer portion 11 has a casing 14 including a front surface 14A formed with an opening 13. The printer portion 11 is configured to form an image on a sheet 12 (see FIG. 2) by an inkjet recording system.

Figure 2:
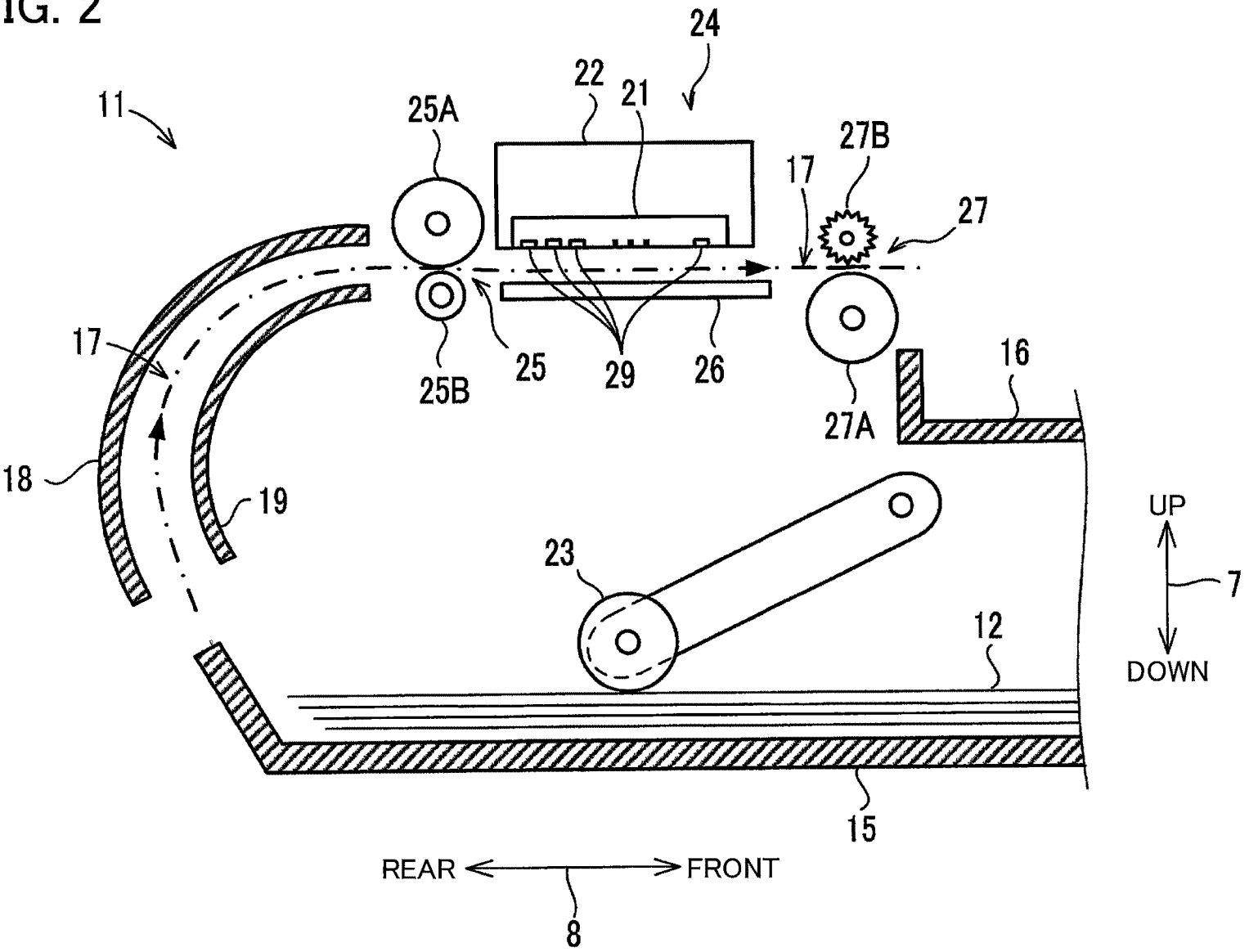
FIG. 2 is a vertical cross-sectional view schematically illustrating an internal configuration of a printer portion provided in the multifunction peripheral according to the embodiment.

The multifunction peripheral 10 also has a feeding roller 23, a feeding tray 15, a discharging tray 16, a pair of conveying rollers 25, a recording portion 24, a pair of discharging rollers 27, a platen 26, and a cartridge attachment portion 110. As illustrated in FIGS. 1B and 2, these components are arranged in the casing 14. The multifunction peripheral 10 has various functions such as a facsimile function and a print function. As described above, the state illustrated in FIG. 1A is the usage posture of the multifunction peripheral 10.

[Feeding Tray 15, Discharging Tray 16, and Feeding Roller 23]

As illustrated in FIGS. 1A and 1B, the feeding tray 15 can be inserted into and extracted from the casing 14 by a user in the front-rear direction 8 through the opening 13. The opening 13 is positioned at a center portion of the front surface 14A of the casing 14 in the left-right direction 9. As illustrated in FIG. 2, the feeding tray 15 can support a plurality of stacked sheets 12.

The discharging tray 16 is disposed above the feeding tray 15. The discharging tray 16 supports the sheet 12 discharged from between the recording portion 24 and the platen 26 by the discharging rollers 27.

The feeding roller 23 feeds the sheet 12 supported by the feeding tray 15 onto a conveyance path 17. The feeding roller 23 is driven by a feeding motor 172 (see FIG. 8).

[Conveyance Path 17]

As illustrated in FIG. 2, the conveyance path 17 is a space partially defined by an outer guide member 18 and an inner guide member 19 opposing each other at a predetermined interval inside the printer portion. The conveyance path 17 extends upward from the rear end portion of the feed tray 15 while making a U-turn, passes through a space between the recording portion 24 and the platen 26, and reaches the discharging tray 16. The conveyance path 17 positioned between the conveying rollers 25 and the discharging rollers 27 in the front-rear direction 8 is provided substantially at a center portion of the multifunction peripheral 10 in the left-right direction 9, and extends in the front-rear direction 8. A conveying direction of the sheet 12 in the conveyance path 17 is indicated by a dashed-dotted arrow in FIG. 2.

[Conveying Rollers 25]

As illustrated in FIG. 2, the pair of conveying rollers 25 is disposed in the conveyance path 17. The conveying rollers 25 include a conveying roller 25A and a pinch roller 25B which are opposed to each other. The conveying roller 25A is driven by a conveying motor 171 (see FIG. 8). The pinch roller 25B is rotated following the rotation of the conveying roller 25A. The sheet 12 is nipped between the conveying roller 25A and the pinch roller 25B while the conveying roller 25A is rotated in a normal direction by the normal rotation of the conveying motor 171, thereby to be conveyed in the conveying direction (i.e., frontward).

[Discharging Rollers 27]

As illustrated in FIG. 2, the pair of discharging rollers 27 is disposed downstream of the conveying rollers 25 on the conveyance path 17 in the conveying direction. The discharging rollers 27 include a discharging roller 27A and a spur 27B which are opposed to each other. The discharging roller 27A is driven by the conveying motor 171 (see FIG. 8). The spur 27B is rotated following the rotation of the discharging roller 27A. The sheet 12 is nipped between the discharging roller 27A and the spur 27B while the discharging roller 27A is rotated in a normal direction by the normal rotation of the conveying motor 171, thereby to be conveyed in the conveying direction (i.e., frontward).

[Recording Portion 24]

As illustrated in FIG. 2, the recording portion 24 (an example of a recording portion) is disposed between the conveying rollers 25 and the discharging rollers 27 on the conveyance path 17 in the conveying direction. The recording portion 24 is arranged to oppose the platen 26 in the up-down direction 7 such that the conveyance path 17 is interposed between the recording portion 24 and the platen 26. The recording portion 24 includes a carriage 22 and a recording head 21.

Figure 3:
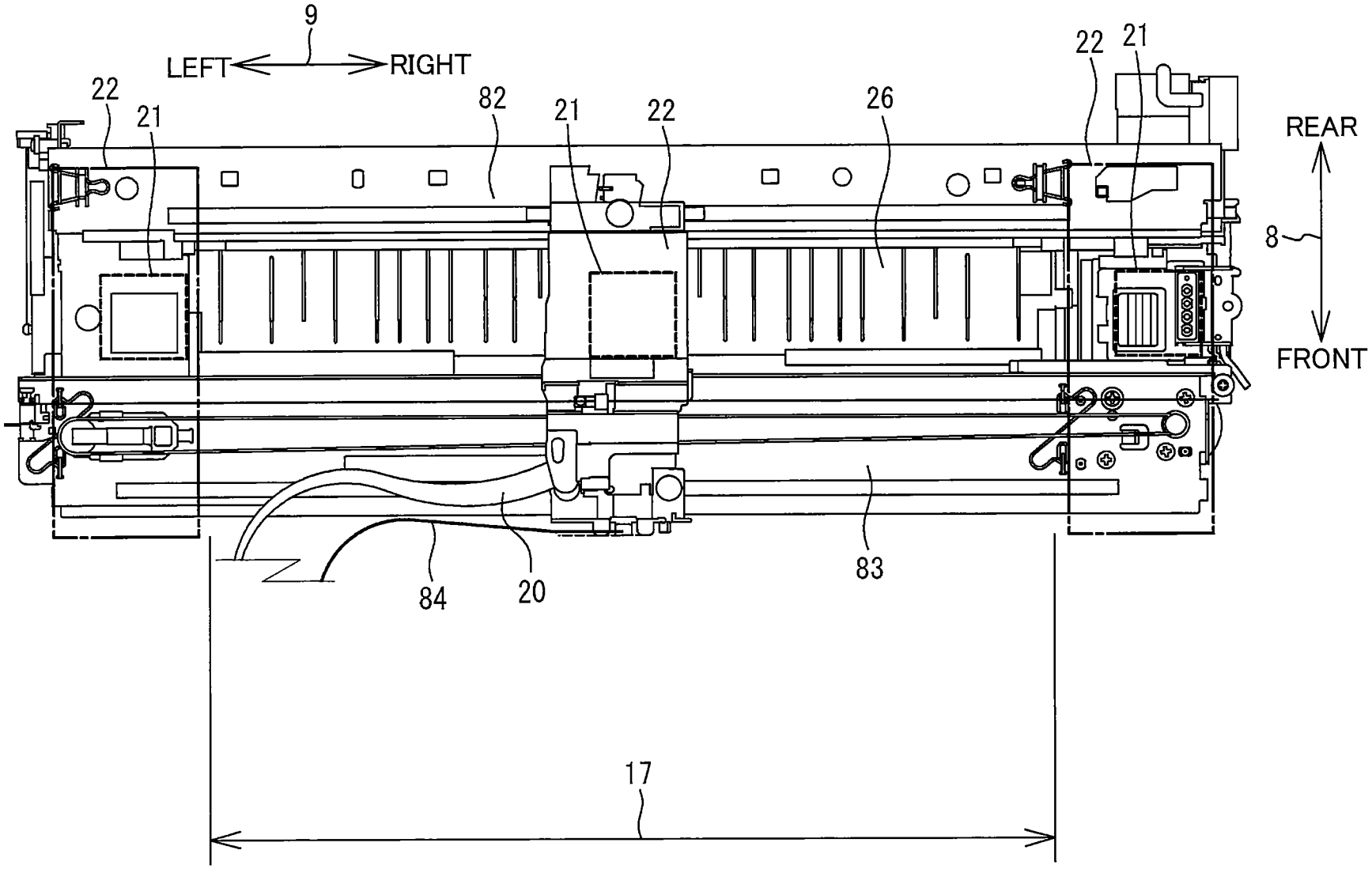
FIG. 3 is a plan view illustrating a positional relationship between a carriage and a platen provided in the multifunction peripheral according to the embodiment.

As illustrated in FIG. 3, the guide rails 82 and 83 extend in the left-right direction 9 at positions spaced apart from each other in the front-rear direction 8, respectively, and are supported by the frame of the printer portion 11. The carriage 22 is supported by the guide rails 82 and 83. A known belt mechanism is provided on the guide rail 83, and the carriage 22 is connected to the belt mechanism. The belt mechanism is driven by a carriage driving motor 173 (see FIG. 8). The carriage 22 connected to the belt mechanism reciprocates in the left-right direction 9 in response that the carriage driving motor 173 is driven. The range of movement of the carriage 22 extends from the right side of the right end of the conveyance path to the left side of the left end of the conveyance path 17, as indicated by the alternate long and short dash line in FIG. 3.

An ink tube 20 and a flexible flat cable 84 extend from the carriage 22.

The ink tube 20 connects the cartridge attachment portion 110 (see FIG. 1B) and the recording head 21. The ink tube 20 supplies the recording head 21 with ink (an example of a liquid) stored in each of ink cartridges 30 (examples of a cartridge) attached to the cartridge attachment portion 110. Four ink tubes 20 through which ink of respective colors (black, magenta, cyan, and yellow) flow are provided corresponding to the four kinds of ink cartridges 30 respectively, and these ink tubes 20 are connected to the carriage 22 in a bundled state.

The flexible flat cable 84 is intended to electrically connect a control unit 130 (see FIG. 8) and the recording head 21. The flexible flat cable 84 transmits a control signal, which is outputted from the control unit 130, to the recording head 21.

As illustrated in FIG. 2, the carriage 22 carries the recording head 21. The recording head 21 includes a plurality of nozzles 29 and a piezoelectric element 45 (see FIG. 8). The nozzles 29 are arranged on the lower surface of the recording head 21. The piezoelectric element 45 deforms a part of the ink flow passage formed in the recording head 21 to eject ink droplets from the nozzles 29. As will be described later, the piezoelectric element 45 operates when power is supplied by the control unit 130.

The recording portion 24 is controlled by the control unit 130. When the carriage 22 moves in the left-right direction 9, the recording head 21 ejects ink droplets from the nozzles 29 toward the sheet 12 supported by the platen 26. As a result, an image is formed on the sheet 12. Further, the ink stored in each ink cartridge 30 is consumed.

[Platen 26]

As illustrated in FIGS. 2 and 3, the platen 26 is disposed between the conveying rollers 25 and the discharging rollers 27 on the conveyance path 17 in the front-rear direction 8. The platen 26 is disposed to oppose the recording portion 24 in the up-down direction 7 such that the conveyance path 17 is interposed between the platen 26 and the recording portion 24. The platen 26 supports the sheet 12 conveyed by the conveying rollers 25 from below.

[Cover 87]

As illustrated in FIG. 1B, an opening 85 is formed in the front surface 14A of the casing 14 at the right end portion thereof. A storage space 86 capable of housing the cartridge attachment portion 110 is formed behind the opening 85. A cover 87 is attached to the casing 14 to cover the opening 85. The cover 87 is pivotable about a pivoting axis 87A (pivoting center) extending in the left-right direction 9 between a closed position (a position illustrated in FIG. 1A) for closing the opening 85 and an open position (a position illustrated in FIG. 1B) for opening the opening 85.

[Cartridge Attachment Portion 110]

Figure 4:
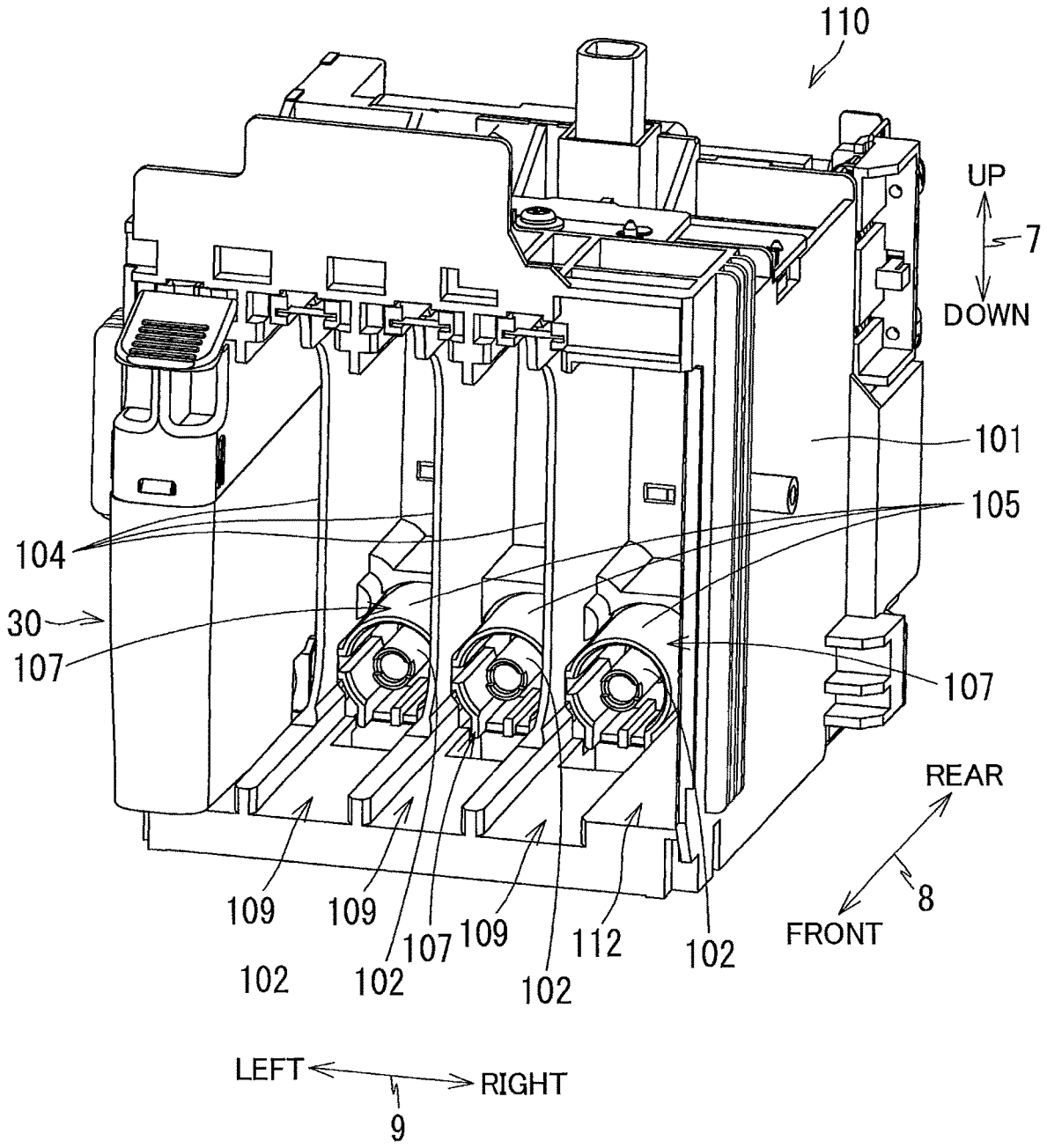
FIG. 4 is a perspective view of a cartridge attachment portion as viewed toward an opening of the cartridge attachment portion in the multifunction peripheral according to the embodiment.
Figure 5:
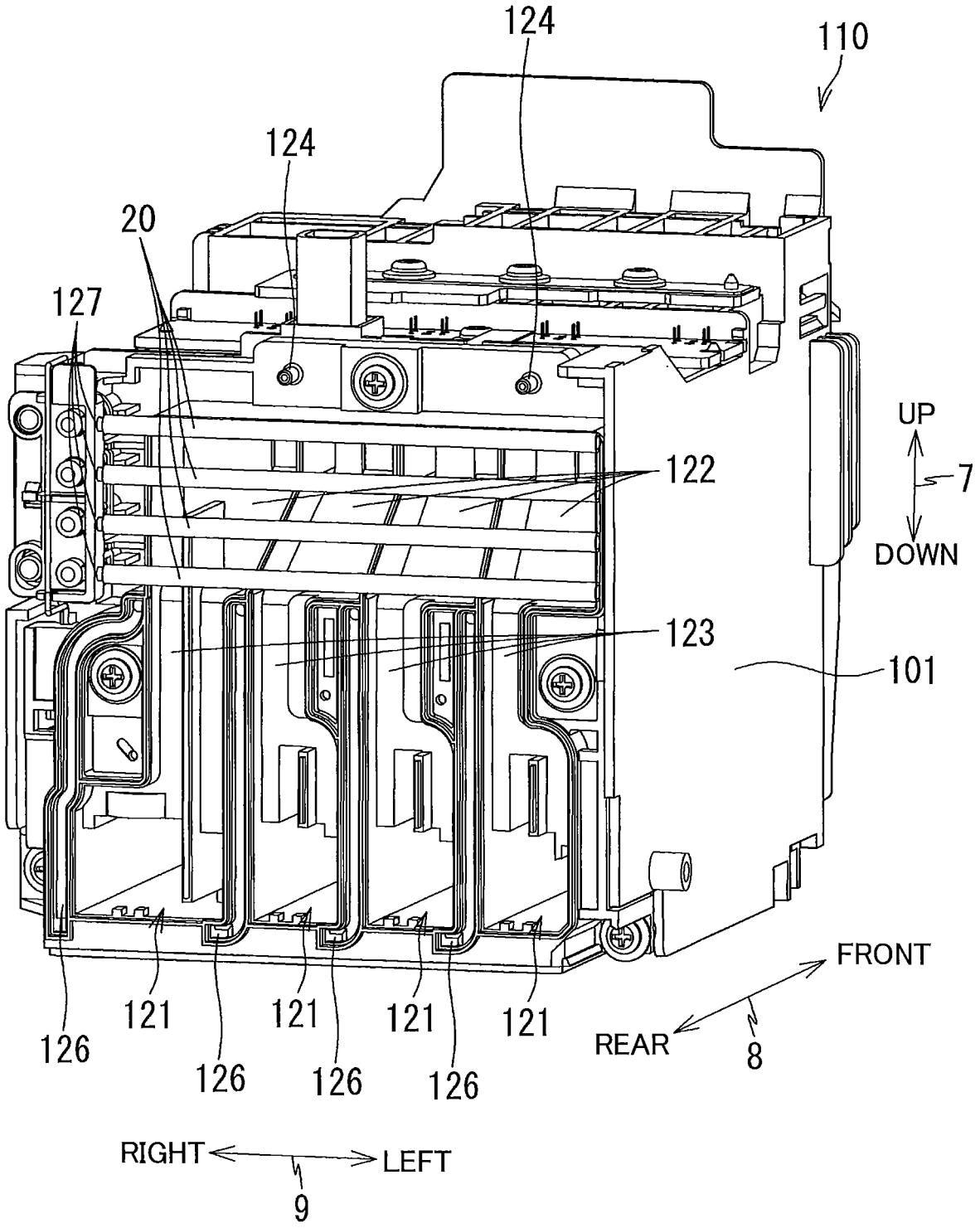
FIG. 5 is a perspective view of the cartridge attachment portion as viewed toward a tank of the cartridge attachment portion in the multifunction peripheral according to the embodiment.
Figure 6:
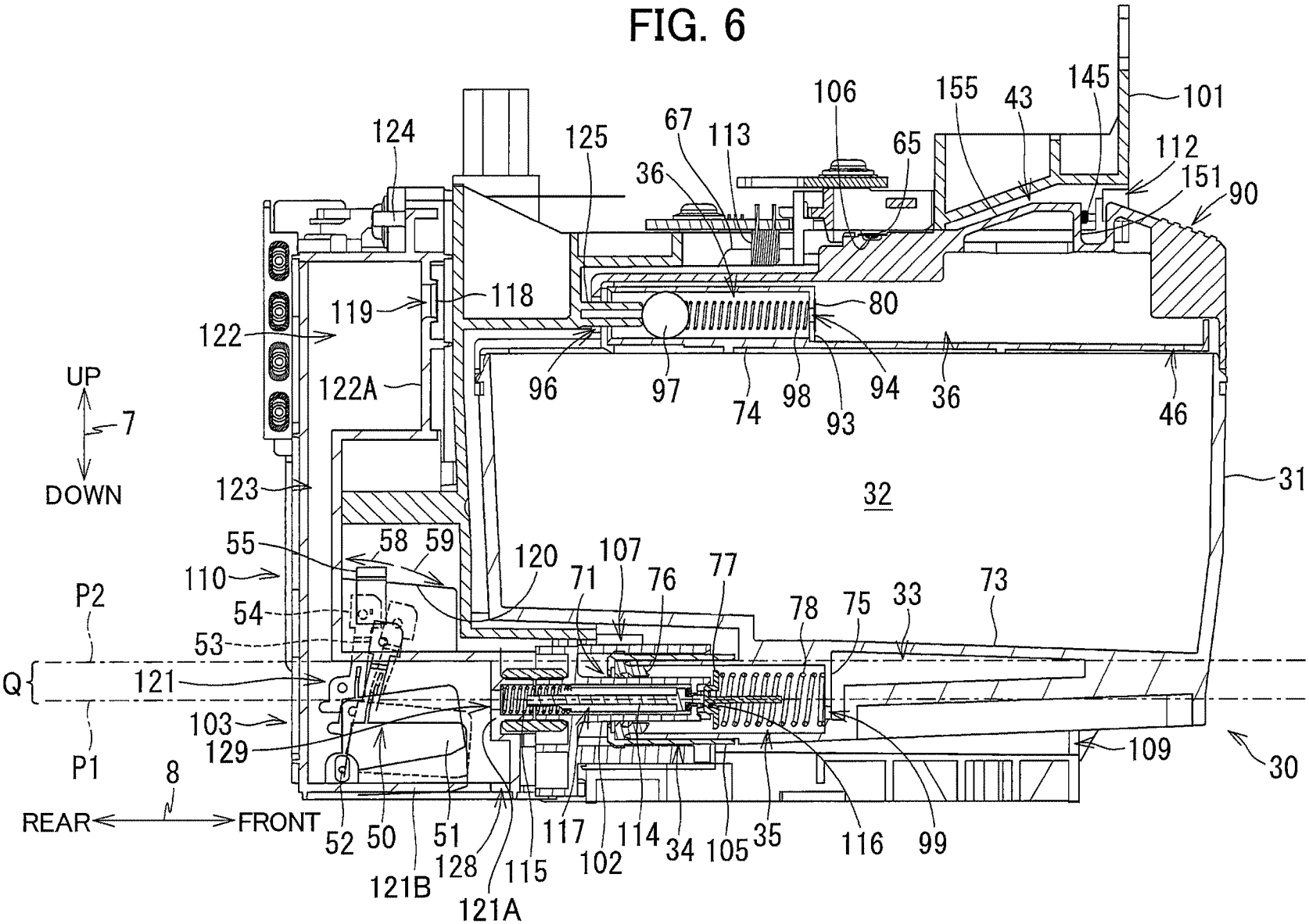
FIG. 6 is a vertical cross-sectional view of the cartridge attachment portion to which an ink cartridge is attached in the multifunction device according to the embodiment.

As illustrated in FIGS. 4 through 6, the cartridge attachment portion 110 includes a cartridge case 101, connecting portions 107, contacts 106, rods 125, attachment sensors 113, locking portions 145, tanks 103, and liquid level sensors 55 (examples of a detecting portion). In the cartridge attachment portion 110, four kinds of ink cartridges 30 corresponding to four colors of cyan, magenta, yellow, and black are detachably mountable. One connecting portion 107, one contact 106, one rod 125, one attachment sensor 113, one locking portion 145, one tank 103, and one liquid level sensor 55 are provided corresponding to each of the four kinds of ink cartridges. Note that the number of the ink cartridges 30 that can be mounted in the cartridge attachment portion 110 is not limited to four, but may be arbitrary.

[Cartridge Case 101]

As illustrated in FIGS. 4 and 5, the cartridge case 101 constitutes the casing of the cartridge attachment portion 110. The cartridge case 101 has a box-like shape defining an internal space therein. Specifically, the cartridge case 101 includes a top wall defining the top part of the internal space, a bottom wall defining the bottom part of the internal space, an end wall connecting the top wall and the bottom wall, a left side wall defining the light end of the internal space, a right side wall defining the right end of the internal space, and an opening 112 positioned opposite to the end wall in the front-rear direction 8. The opening 112 can be exposed to the front surface 14A of the casing 14 when using the multifunction peripheral 10.

The ink cartridges 30 can be inserted into and extracted from the cartridge case 101 through the opening 85 of the casing 14 and the opening 112 of the cartridge attachment portion 110. In the cartridge case 101, the bottom wall of the internal space is formed with four guide grooves 109 for guiding insertion/extraction of the ink cartridges 30. The ink cartridge 30 is guided in the front-rear direction 8 indicated in FIG. 4 by inserting the lower end portion of the ink cartridge 30 into the guide groove 109. The cartridge case 101 is also provided with three plates 104 that partition the internal space into four spaces each elongated in the up-down direction 7. Each of the four kinds of ink cartridges 30 can be mounted in a corresponding one of the four spaces partitioned by the plate 104.

Hereinafter, for simplifying explanation, only one ink cartridge 30 is assumed to be mounted in the cartridge case 101 of the cartridge attachment portion 110.

[Connecting Portion 107]

As illustrated in FIG. 4, each connecting portion 107 includes an ink needle 102 and a guide portion 105.

The ink needle 102 (an example of a connecting portion and a tubular member) is made of resin and has a generally tubular shape. The ink needle 102 is disposed on a lower end portion of the end wall constituting the cartridge case 101. Specifically, the ink needle 102 is disposed at a position corresponding to an ink supply portion 34 (an example of supply portion, to be described later) of the ink cartridge 30 attached to the cartridge attachment portion 110 on the end wall of the cartridge case 101. The ink needle 102 horizontally protrudes frontward from the end wall of the cartridge case 101.

The guide portion 105 has a cylindrical shape, and is provided on the end wall to surround the ink needle 102. The guide portion 105 protrudes frontward from the end wall of the cartridge case 101. The guide portion 105 has a protruding end that is open forward (see FIG. 6). Specifically, the ink needle 102 is positioned at a diametrical center of the guide portion 105. The guide portion 105 is shaped to allow the ink supply portion 34 of the attached ink cartridge 30 to be received in the guide portion 105.

The connecting portion 107 is not connected to the ink supply portion 34 of the ink cartridge 30 in a state where the ink cartridge 30 is not attached to the cartridge attachment portion 110. During insertion of the ink cartridge 30 into the cartridge attachment portion 110, i.e., in the course of action for bringing the ink cartridge 30 into an attached position attached to the cartridge attachment portion 110 (a position illustrated in FIG. 6), the ink supply portion 34 of the ink cartridge 30 enters into the guide portion 105 in the insertion direction (i.e., rearward). As the ink cartridge 30 is further inserted rearward, the ink needle 102 enters into an ink supply port 71 formed in the ink supply portion 34. As a result, the connecting portion 107 is connected to the ink supply portion 34. Hence, the ink stored in a storage chamber 33 formed in the ink cartridge 30 is allowed to flow into the tank 103 through an ink valve chamber 35 defined in the ink supply portion 34 and an internal space 117 defined in the ink needle 102. Incidentally, the ink needle 102 may have a flat-shaped tip end or a pointed tip end.

As illustrated in FIG. 6, a valve 114 and a coil spring 115 are housed in the internal space 117 of the ink needle 102. The valve 114 is movable in the front-rear direction 8 to open and close an opening 116 formed in a protruding tip portion of the ink needle 102. That is, the valve 114 opens and closes the internal space 117 of the ink needle 102. The coil spring 115 urges the valve 114 frontward. Accordingly, the valve 114 closes the opening 116 in a state where no external force is applied (a state where the ink cartridge 30 is not attached to the cartridge attachment portion 110). Further, a front end portion of the valve 114 urged by the coil spring 115 protrudes frontward from the opening 116 in a state where no external force is applied. In the process of connecting the connecting portion 107 and the ink supply portion 34, the valve 114 opens the opening 116. The operation of opening the opening 116 by the valve 114 will be described later.

[Contacts 106]

As illustrated in FIG. 6, four contacts 106 are provided on the top wall of the cartridge case 101. Each contact 106 protrudes downward from the top surface toward the internal space of the cartridge case 101. Although not illustrated in detail in the drawings, the four contacts 106 are arranged to be spaced apart from one another in the left-right direction 9. Each of the four contacts 106 is arranged at a position corresponding to each one of four electrodes 65 of the ink cartridge 30 as will be described later. Each contact 106 is made of a material having electrical conductivity and resiliency. The contacts 106 are therefore upwardly resiliently deformable. Four sets of the four contacts 106 are disposed corresponding to the four kinds of ink cartridges 30 that can be mounted in the cartridge case 101. Note that the number of contacts 106 and the number of electrodes may be arbitrary.

Each contact 106 is electrically connected to the control unit 130 (see FIG. 8) via an electrical circuit. When the respective contacts 106 are engaged with the corresponding electrodes 65 to be electrically connected to the same, so that: a voltage Vc is applied to the corresponding electrode 65; the corresponding electrode 65 is grounded; and power is supplied to the corresponding electrode 65. Due to establishment of the electrical connection between the contacts 106 and the electrodes 65, the data stored in an IC of the ink cartridge 30 is made electrically accessible. Outputs from the electrical circuits are configured to be inputted into the control unit 130.

[Rod 125]

As illustrated in FIG. 6, a rod 125 is provided at a position above the ink needle 102 on the end wall of the cartridge case 101. The rod 125 protrudes frontward from the end wall of the cartridge case 101. The rod 125 has a cylindrical shape. The rod 125 is inserted into an air communication port 96 to be described later, in a state where the ink cartridge 30 is attached to the cartridge attachment portion 110, that is, when the ink cartridge 30 in the attached position.

[Attachment Sensor 113]

As illustrated in FIG. 6, the attachment sensor 113 is also disposed at the top wall of the cartridge case 101. The attachment sensor 113 detects whether or not the ink cartridge 30 is attached to the cartridge attachment portion 110. The attachment sensor 113 is disposed at a position frontward of the rod 125 but rearward of the contacts 106. In the present embodiment, the attachment sensor 113 includes a light-emitting element and a light-receiving element. The light-emitting element is arranged to oppose the light-receiving element and is spaced apart from the light-receiving element in the left-right direction 9. When the ink cartridge 30 has been attached to the cartridge attachment portion 110, a light-shielding plate 67 (to be described later) of the attached ink cartridge 30 is disposed between the light-emitting element and the light-receiving element of the attachment sensor 113. In other words, the light-emitting element and the light-receiving element are arranged to oppose each other with the light-shielding plate 67 of the attached ink cartridge 30 interposed therebetween.

The attachment sensor 113 is configured to output different detection signals depending on whether or not light emitted in the left-right direction 9 from the light-emitting element is received by the light-receiving element. For example, the attachment sensor 113 outputs a low-level signal to the control unit 130 (see FIG. 8) when the light emitted from the light-emitting element is not received at the light-receiving element (that is, when an intensity of the light received at the light-receiving element is less than a predetermined intensity). On the other hand, the attachment sensor 130 outputs a high-level signal to the control unit 130 (see FIG. 8) when the light emitted from the light-emitting element is received at the light-receiving element (that is, when the intensity of the received light is equal to or greater than the predetermined intensity).

[Locking Portion 145]

As illustrated in FIG. 6, the locking portion 145 is disposed in the vicinity of the top wall of the cartridge case 101 and in the vicinity of the opening 112. The locking portion 145 is a bar-like member extending in the left-right direction 9. The locking portion 145 is, for example, a metal cylinder. The left end of the locking portion 145 in the left-right direction 9 are fixed to the left side wall of the cartridge case 101, and the right end of the locking portion 145 in the left-right direction 9 are fixed to the right wall of the cartridge case 101. The locking portion 145 extends in the left-right direction 9 over four spaces in which the four kinds of ink cartridges 30 can be mounted.

The locking portion 145 is adapted to hold the ink cartridge 30 attached to the cartridge attachment portion 110 at the attached position. The ink cartridge 30 is engaged with the locking portion 145 in a state where the ink cartridge 30 is attached to the cartridge attachment portion 110. Accordingly, the locking portion 145 holds the ink cartridge 30 against a force of pushing the ink cartridge 30 frontward by a coil spring 78 and a coil spring 98 of the ink cartridge 30.

[Tank 103]

As illustrated in FIGS. 4 through 6, a tank 103 (an example of a tank) is provided in a rear portion of the cartridge case 101. The tank 103 has a box shape having therein a storage chamber 121 (an example of a second storage chamber) and a buffer chamber 122. The storage chamber 121 and the buffer chamber 122 are arranged in the up-down direction 7. Specifically, the buffer chamber 122 is disposed at a position above the storage chamber 121. The storage chamber 121 and the buffer chamber 122 are in communication with each other by a flow passage 123 extending in the up-down direction 7. The storage chamber 121, the buffer chamber 122, and the flow passage 123 are spaces defined by the outer wall of the tank 103, respectively. The storage chamber 121 is substantially rectangular in cross-section taken along a horizontal plane. The storage chamber 121 extends frontward from the flow passage. The cross-sectional area of the storage chamber 121 taken along the horizontal plane is larger than the cross-sectional area of the flow passage 123 taken along the horizontal plane.

The storage chamber 121 is in communication with the internal space of the ink needle 102 at the front side via a communication port 129 (an example of a liquid flow-in port). The storage chamber 121 has a front wall 121A defining the front end of the storage chamber 121. The communication port 129 is formed in the front wall 121A. As a result, ink flowing out of the ink cartridge 30 through the ink needle 102 is stored in the storage chamber 121. In the tank 103, a convex portion 120 is formed at a position above the storage chamber 121 but frontward of the flow passage 123. An internal space of the convex portion 120 connects to the storage chamber 121. The convex portion 120 has a pair of side walls facing in the left-right direction 9 and each of the side walls is made of a translucent member. An arm 53 and a detected part 54 of a pivoting member 50 described later are disposed in the convex portion 120.

The storage chamber 121 is in communication with the ink flow passage 126 via a communication port 128 (an example of a liquid flow-out port). The storage chamber 121 has a bottom wall 121B defining the bottom end of the storage chamber 121. The communication port 128 is formed on the bottom wall 121B of the storage chamber 121. The communication port 128 is disposed below the communication port 129 in a direction of gravity.

The ink flow passage 126 extends upward from the storage chamber 121 and connects to an ink outflow port 127. The ink tube 20 is connected to the ink outflow port 127. As a result, the ink stored in the storage chamber 121 flows out via the communication port 128 and is supplied to the recording head 21 through the ink flow passage 126 and the ink tube 20.

The buffer chamber 122 is in communication with an air communication port 124 (an example of a second air communication portion) formed in the upper part of the tank 103. Specifically, the buffer chamber 122 has a front wall 122A defining a front end of the buffer chamber 122, and a through-hole 119 is formed on the front wall 122A (see FIG. 6). The buffer chamber 122 is in communication with the air communication port 124 through the through-hole 119. The through-hole 119 is sealed with a semipermeable membrane 118. The air communication port 124 is open to the outside. As a result, the storage chamber 121 and the buffer chamber 122 can be open to an atmosphere. That is, the air communication port 124 allows the storage chamber 121 and the buffer chamber 122 to be in communication with the atmosphere. Note that the communication of the storage chamber 121 and the buffer chamber 122 with the atmosphere is not limited to a regular atmosphere communication as in the present embodiment, but may be a configuration in which the communication with the atmosphere is maintained and blocked. For example, a well-known switching unit for switching the communication with the atmosphere may be provided to switch between an atmosphere communication state and an atmosphere blocking state.

In FIG. 5, a film constituting the back surface of the tank 103 is omitted, but the back surfaces of each of the storage chamber 121, the buffer chamber 122, the flow passage 123, and the ink flow passage 126 are configured to be sealed with films.

[Pivoting Member 50]

As illustrated in FIG. 6, the pivoting member 50 is disposed in the storage chamber 121 of the tank 103. The pivoting member 50 is supported so as to be rotatable in directions of an arrow 58 and an arrow 59 by a supporting member (not illustrated) disposed in the storage chamber 121. The pivoting member 50 may be supported by a member other than the supporting member. For example, the pivoting member 50 may be supported by a wall of the cartridge case 101 that partitions the storage chamber 121.

The pivoting member 50 includes a float 51, a shaft 52, the arm 53, and the detected part 54. The float 51 is positioned in a lower part of the pivoting member 50. The float 51 is made of a material having a specific gravity smaller than that of the ink stored in the storage chamber 121. The shaft 52 protrudes from the left surface and the right surface of the float 51 in the left-right direction 9. The shaft 52 is inserted into a hole formed in the support member. As a result, the pivoting member 50 is supported by the supporting member so as to be pivotable about the shaft 52.

The arm 53 protrudes substantially upward from the float 51. The detected part 54 is formed at the protruding tip portion of the arm 53. The arm 53 and the detected part 54 are located in the internal space of the convex portion 120. The detected part 54 has a plate shape extending in the up-down direction 7 and the front-rear direction 8. The detected part 54 is made of a material that shields light outputted from a light-emitting element of the liquid level sensor 55 to be described later.

When the liquid level of the ink stored in the storage chamber 121 is higher than the position P1 of the connecting portion 107 in the up-down direction 7, in other words, when the level of the ink stored in the storage chamber 33 of the ink cartridge 30 is higher than the position P1 of the ink supply portion 34 in the up-down direction 7, the pivoting member 50 pivots in the direction of the arrow 58 due to buoyancy acting on the float 51. As a result, the pivoting member 50 is positioned at a detection position partially indicated by a solid line in FIG. 6.

In the present embodiment, the position P1 is the same height as the center of the axis of the ink needle 102 and is the same height as the center of the ink supply port 71. However, the position P1 is not limited to the position of the present embodiment as long as the position P1 is the same height as the connecting portion 107 and the ink supply portion 34 in the up-down direction 7. For example, the position P1 may be the same height as the upper end or the lower end of the ink needle 102, or may be the same height as the upper end or the lower end of the ink supply port 71.

On the other hand, when the ink stored in the storage chamber 121 and the ink valve chamber 35 is consumed and the liquid level of the ink stored in the storage chamber 121 is lowered to be a position equal to or lower than the position P1 in the up-down direction 7, the pivoting member 50 follows the liquid level of the ink stored in the storage chamber 121 and rotates in the direction of the arrow 59. As a result, the pivoting member 50 is positioned at a non-detection position indicated by the broken line in FIG. 6. That is, the pivoting member 50 changes its state under the condition that the liquid level of the ink stored in the storage chamber 121 arrives at the same position as the connecting portion 107 in the up-down direction 7.

[Liquid Level Sensor 55]

The liquid level sensor 55 (see FIG. 8) detects a state change of the pivoting member 50 provided with the detected part 54. In the present embodiment, the liquid level sensor 55 includes a light-emitting element and a light-receiving element. The light-emitting element and the light-receiving element are arranged to be spaced apart from each other in the left-right direction 9 with the convex portion 120 of the tank 103 interposed therebetween. The light-emitting element is disposed on one of the right side and the left side of the convex portion 120, whereas the light-receiving element is disposed on the other of the right side and the left side of the convex portion 120. The optical path of the light outputted from the light-emitting element coincides with the left-right direction 9. When the pivoting member 50 is positioned at the detection position, the detected part 54 of the pivoting member 50 is positioned between the light-emitting element and the light-receiving element of the liquid level sensor 55.

The liquid level sensor 55 outputs detection signals different from each other dependent on whether or not the light outputted from the light-emitting element is received at the light-receiving element. For example, the liquid level sensor 55 outputs a low-level signal (referring "a signal whose signal level is less than the threshold level") to the control unit 130 (see FIG. 8) under the condition that the light outputted from the light-emitting element cannot be received by the light-receiving element (that is, the intensity of the light received at the light-receiving element is less than the predetermined intensity). On the other hand, the liquid level sensor 55 outputs a high-level signal (referring to "a signal whose signal level is equal to or higher than the threshold level") to the control unit 130 under the condition that the light outputted from the light-emitting element can be received at the light-receiving element (that is the intensity of the light received at the light-receiving element is equal to or higher than the predetermined intensity).

The detected part 54 at the detection position is positioned between the light-emitting element and the light-receiving element. Thus, when the liquid level of the ink stored in the storage chamber 121 of the tank 103 (in other words, the liquid level of the ink stored in the storage chamber 33 of the ink cartridge 30) is higher than the position P1 in the up-down direction 7, the light outputted from the light-emitting element cannot be received at the light-receiving element. Accordingly, the liquid level sensor 55 outputs the low-level signal to the control unit 130. On the other hand, the detected part 54 at the non-detection position is retracted from between the light-emitting element and the light-receiving element. Thus, when the liquid level of the ink stored in the storage chamber 121 of the tank 103 (in other words, the liquid level of the ink stored in the storage chamber 33 of the ink cartridge 30) is equal to or lower than the position P1 in the up-down direction 7, the light outputted from the light-emitting element can be received at the light-receiving element. Accordingly, the liquid level sensor 55 outputs the high-level signal to the control unit 130.

[Ink Cartridge 30]

Figure 7:
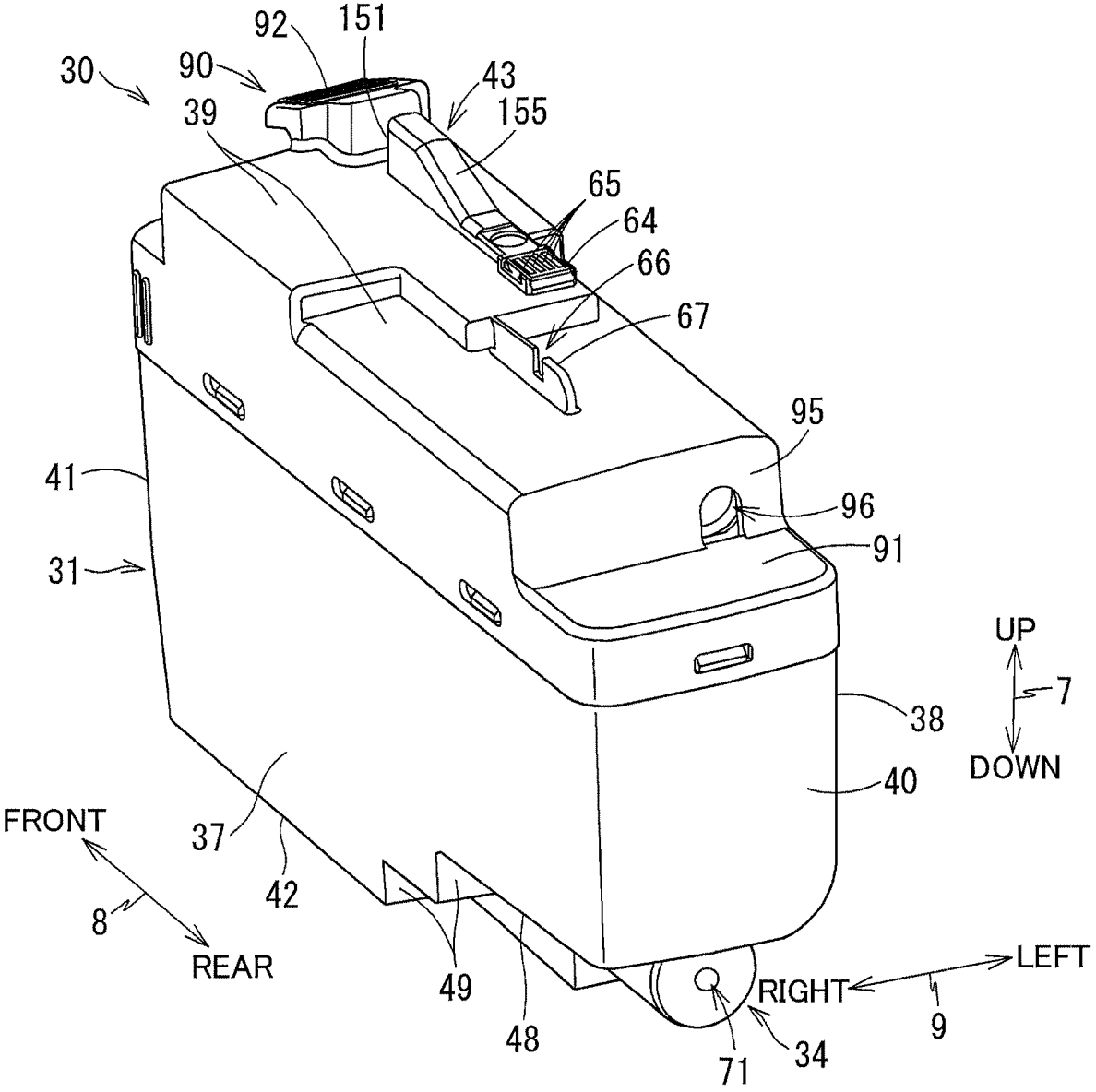
FIG. 7 is a perspective view of the ink cartridge as viewed from a rear side of the ink cartridge in the multifunction peripheral according to the embodiment.

The ink cartridge 30 illustrated in FIGS. 6 and 7 is a container configured to store ink therein. The posture of the ink cartridge 30 illustrated in FIGS. 6 and 7 is the usage posture.

As illustrated in FIGS. 6 and 7, the ink cartridge 30 has a substantially rectangular parallelepiped casing 31. The casing 31 includes a rear wall 40, a front wall 41, a top wall 39, a bottom wall 42, a right side wall 37, and a left side wall 38.

The casing 31 as a whole has a generally flat shape having a height in the up-down direction 7, a width in the left-right direction 9, and a length in the front-rear direction 8, the width being smaller than the height and the length. In the casing 31, at least the front wall 41 has translucency so that the liquid level of the ink stored in a storage chamber 32 (to be described later) and the storage chamber 33 can be visually recognized from the outside.

The casing 31 is positioned above the bottom wall 42, and has a sub-bottom wall 48 extending frontward continuously from the lower end of the rear wall 40. The bottom wall 42 and the sub-bottom wall 48 are continuous by a stepped surface 49. The ink supply portion 34 extends rearward from the stepped surface 49 below the sub-bottom wall 48 and above the bottom wall 42.

A convex portion 43 is provided at the outer surface of the top wall 39 to protrude upward therefrom. The convex portion 43 extends in the front-rear direction 8. The convex portion 43 has a lock surface 151 facing frontward. The lock surface 151 is positioned above the top wall 39. The lock surface 151 is a surface that can come into contact with the locking portion 145 in a state where the ink cartridge 30 is attached to the cartridge attachment portion 110. After the lock surface 151 comes into contact with the locking portion 145, the lock surface 151 pushes the locking portion 145 frontward, so that the ink cartridge 30 is held in the cartridge attachment portion 110 against the urging force of the coil springs 78 and 98.

The convex portion 43 also has an inclined surface 155. The inclined surface 155 is disposed rearward of the lock surface 151. In the process of attaching the ink cartridge 30 to the cartridge attachment portion 110, the locking portion 145 is guided along the inclined surface 155. As a result, the locking portion 145 is guided to a position coming into contact with the lock surface 151.

An operation unit 90 is disposed in front of the lock surface 151 of the top wall 39. The operation unit 90 includes an operation surface 92. When the operation surface 92 is pushed down in a state where the ink cartridge 30 is attached to the cartridge attachment portion 110, the ink cartridge 30 pivots and the lock surface 151 therefore moves downward. Thus, the lock surface 151 is positioned lower than the locking portion 145. As a result, the ink cartridge 30 can be extracted from the cartridge attachment portion 110 in an extraction direction (frontward).

The light-shielding plate 67 is provided at the outer surface of the top wall 39 to protrude upward therefrom. The light-shielding plate 67 extends in the front-rear direction 8. The light-shielding plate 67 is disposed rearward of the convex portion 43.

The light-shielding plate 67 is disposed between the light-emitting element and the light-receiving element of the attachment sensor 113 in a state where the ink cartridge 30 is attached to the cartridge attachment portion 110. As a result, the light-shielding plate 67 shields the light from the attachment sensor 113 traveling in the left-right direction 9. More specifically, when the light emitted from the light-emitting element of the attachment sensor 113 is incident on the light-shielding plate 67 before arriving at the light-receiving element, the intensity of the light received at the light-receiving element becomes less than the predetermined intensity, for example, zero. Note that the light-shielding plate 67 may completely shield the light traveling in the left-right direction 9, may partially attenuate the light, may refract the light to change a traveling direction thereof, or may fully reflect the light.

In the present embodiment, a notch 66 is formed in the light-shielding plate 67. The notch 66 is a space that is recessed downward from the upper end of the light-shielding plate 67, and spreads in the front-rear direction 8. Since the notch 66 is positioned in the attachment sensor 113, the light emitted from the light-emitting element of the attachment sensor 113 is not shielded before arriving at the light-receiving element. The type of the ink cartridge 30, that is, the type and the initial quantity of the ink stored in the ink cartridge 30 can be determined on the basis of the presence or absence of the notch 66 in the light-shielding plate 67.

An IC board 64 is provided between the light-shielding plate 67 and the convex portion 43 on the outer surface of the top wall 39 in the front-rear direction 8. The IC board 64 is electrically connected to the contact 106 in a state where the ink cartridge 30 is attached to the cartridge attachment portion 110.

An integrated circuit (IC; not illustrated in the drawings) and four electrodes 65 are mounted on the IC board 64. The four electrodes 65 are aligned in the left-right direction 9. The IC stores data indicating information related to the ink cartridge 30 such as a lot number, a date of manufacture, ink color, and the like in such a manner that the information is readable from the IC.

Each of four electrodes 65 is electrically connected to the IC, and extends in the front-rear direction 8. The four electrodes 65 are arranged to be spaced apart from one another in the left-right direction 9. Each electrode 65 is exposed so as to be electrically accessible to the upper surface of the IC board 64.

The casing 31 has a sub-top surface 91 at the rear end of the outer surface of the top wall 39. The outer surface of the top wall 39 and the sub-top surface 91 are continuous by a stepped surface 95. Specifically, the stepped surface 95 extends upward from the front end of the sub-top surface 91 disposed at the rear end of the outer surface of the top wall 29. The stepped surface 95 is a surface facing rearward. The stepped surface 95 is formed with an air communication port 96 (an example of a first air communication portion) through which the storage chamber 32 is in communication with the atmosphere. In the process of attaching the ink cartridge 30 to the cartridge attachment portion 110, as illustrated in FIG. 6, the rod 125 enters an air valve chamber 36 (described later) through the air communication port 96. The rod 125 having entered the air valve chamber 36 moves a valve 97 for sealing the air communication port 96 frontward against the urging force of the coil spring 98. When the valve 97 is moved frontward and is separated from the air communication port 96, the storage chamber 32 is open to the atmosphere.

As illustrated in FIG. 6, the storage chamber 32, the storage chamber 33, the ink valve chamber 35, and the air valve chamber 36 are formed inside the casing 31. The storage chamber 32, the storage chamber 33, and the ink valve chamber 35 store the ink. The air valve chamber 36 communicates air between the storage chamber 32 and the outside of the casing 31. The storage chamber 32 and the storage chamber 33 are disposed adjacent to each other in the up-down direction 7 with a partition wall 73 partitioning the inner space of the casing 31 interposed therebetween. Further, the storage chamber 32 and the storage chamber 33 communicate with each other through a through-hole (not illustrated) formed in the partition wall 73. The storage chamber 32 and the air valve chamber 36 are disposed adjacent to each other in the up-down direction 7 with a partition wall 74 partitioning the inner space of the casing 31 interposed therebetween. Further, the storage chamber 32 and the air valve chamber 36 communicate with each other through a through-hole 46 formed in the partition wall 74. The storage chamber 33 and the ink valve chamber 35 are disposed adjacent to each other in the front-rear direction 8 with a partition wall 75 partitioning the inner space of the casing 31 interposed therebetween. Further, the storage chamber 33 and the ink valve chamber 35 communicate with each other through a through-hole 99 formed in the lower end of the storage chamber 33.

Accordingly, the storage chamber 32 is a space defined by each inner surface of the outer wall of the casing 31, the upper surface of the partition wall 73, and the lower surface of the partition wall 74. The storage chamber 33 is a space defined by each inner surface of the outer wall of the casing 31, the lower surface of the partition wall 73, and the front surface of the partition wall 75. The storage chamber 32 and the storage chamber 33 are examples of a first storage chamber.

The valve 97 and the coil spring 98 are housed in the air valve chamber 36. The air valve chamber 36 communicates with the outside through the air communication port 96 formed in the stepped surface 95. The valve 97 is movable between a closed position at which the valve 97 seals the air communication port 96 and an open position at which the valve 97 is separated from the air communication port 96. The coil spring 98 is disposed to be extensible and contractible in the front-rear direction 8, and urges the valve 97 in a direction to move the valve 97 to contact the air communication port 96, that is, rearward.

The front end of the air valve chamber 36 is defined by a wall 93 formed with a through-hole 94. The storage chamber 32 communicates with the air valve chamber 36 through the through-hole 46 and the through-hole 94. The through-hole 94 is sealed with a semipermeable membrane 80.

The ink supply portion 34 protrudes rearward from the stepped surface 49. The ink supply portion 34 has a cylindrical outer shape. The inner space of the ink supply portion 34 serves as the ink valve chamber 35 (an example of a liquid passage). The ink supply portion 34 has a protruding end that is open rearward to the outside of the ink cartridge 30 through the ink supply port 71. A seal member 76 is provided at the rear end of the ink supply portion 34. The front end of the ink supply portion 34 communicates with the lower end of the storage chamber 33 through the through-hole 99 as described above. That is, the ink supply portion 34 communicates with the lower end of the storage chamber 33.

A valve 77 and the coil spring 78 are housed in the ink valve chamber 35. The valve 77 moves in the front-rear direction 8 to open and close the ink supply port 71 penetrating the center portion of the seal member 76. The coil spring 78 urges the valve 77 rearward. Accordingly, the valve 77 closes the ink supply port 71 of the seal member 76 in a state where no external force is applied.

The seal member 76 is a disk-shaped member in which a through-hole is formed at the center portion thereof. The seal member 76 is made of, for example, an elastic material such as rubber or elastomer. The center portion of the seal member 76 is penetrated in the front-rear direction 8 to form a cylindrical inner peripheral surface serving as the ink supply port 71. The inner diameter of the ink supply port 71 is slightly smaller than the outer diameter of the ink needle 102.

When the ink cartridge 30 is attached to the cartridge attachment portion 110 in a state where the valve 77 closes the ink supply port 71 and the valve 114 closes the opening 116 of the ink needle 102, the ink needle 102 enters the ink valve chamber 35 through the ink supply port 71. That is, the connecting portion 107 and the ink supply portion 34 are connected to each other. At this time, the outer peripheral surface of the ink needle 102 liquid-tightly contacts the inner peripheral surface of the seal member 76 that defines the ink supply port 71, while elastically deforming the seal member 76. When the tip of the ink needle 102 passes through the seal member 76 to further enter the ink valve chamber 35, the tip of the ink needle 102 abuts on the valve 77. When the ink cartridge 30 is further inserted into the cartridge attachment portion 110, the ink needle 102 moves the valve 77 frontward against the urging force of the coil spring 78. As a result, the ink supply port 71 is opened.

Further, while the tip of the ink needle 102 abuts on the valve 77, the valve 77 abuts on the valve 114 from the front side and pushes it. Then, the valve 114 moves rearward against the urging force of the coil spring 115. Thus, the opening 116 is opened. As a result, the ink stored in the ink valve chamber 35 can flow into the storage chamber 121 of the tank 103 through the internal space 117 of the ink needle 102. As described above, the ink stored in the storage chamber 32, the storage chamber 33, and the ink valve chamber 35 is supplied to the storage chamber 121 of the tank 103 by the ink supply portion 34.

[Control Unit 130]

Figure 8:
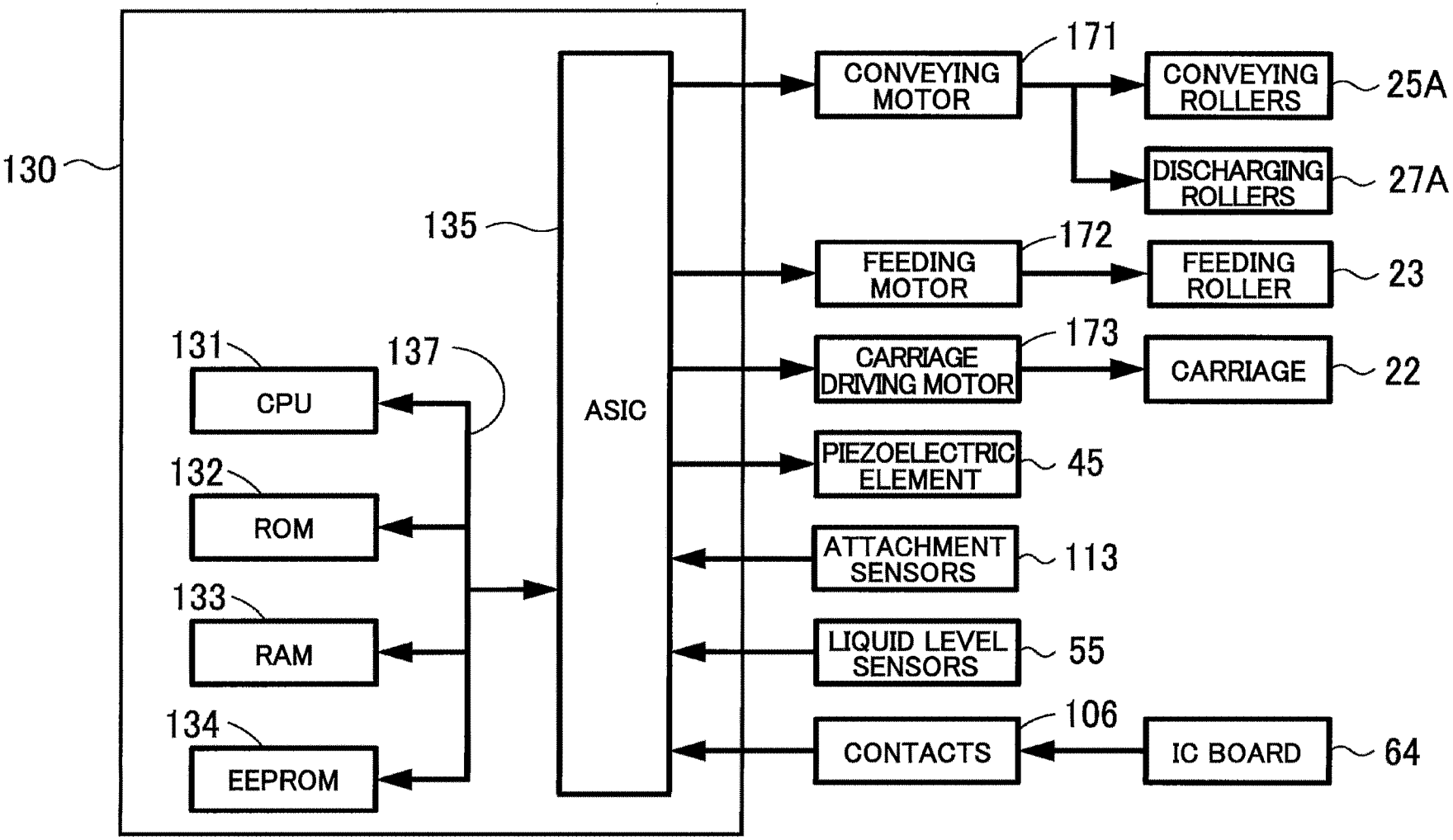
FIG. 8 is a block diagram illustrating a structure of a control portion in the multifunction peripheral according to the embodiment.

Hereinafter, a schematic configuration of the control unit 130 will be described with reference to FIG. 8. The control unit 130 controls the overall operation of the multifunction peripheral 10. The control unit 130 includes a central processing unit (CPU) 131, a read-only memory (ROM) 132, a random access memory (RAM) 133, an electrically erasable programmable read-only memory (EEPROM) 134, an application specific integrated circuit (ASIC) 135, and an internal bus 137 which connects these components to one another.

The ROM 132 stores a program for causing the CPU 131 to control various operations including the image forming control. The RAM 133 is used as a storage region which temporarily stores data and signals used when the CPU 131 executes the program. The EEPROM 134 stores settings and flags to be retained even after the power of the multifunction peripheral 10 is turned off.

The conveying motor 171, the feeding motor 172, and the carriage driving motor 173 are connected to the ASIC 135. A drive circuit for controlling each motor is incorporated in the ASIC 135. When a drive signal for rotating a predetermined motor is inputted from the CPU 131 to a drive circuit corresponding to the predetermined motor, a drive current corresponding to the drive signal is outputted from the drive circuit to the corresponding motor. As a result, the corresponding motor rotates. That is, the control unit 130 controls the driving of the motors 171, 172, and 173.

Further, a signal outputted from the attachment sensor 113 is inputted to the ASIC 135. When the signal inputted from the attachment sensor 113 is at a low level, the control unit 130 determines that the ink cartridge 30 is attached to the cartridge attachment portion 110. On the other hand, when the signal inputted from the attachment sensor 113 is at a high level, the control unit 130 determines that the ink cartridge 30 is not attached to the cartridge attachment portion 110.

Furthermore, a signal outputted from the liquid level sensor 55 is inputted to the ASIC 135. When the signal inputted from the liquid level sensor 55 is at a low level, the control unit 130 determines that the liquid level of the ink stored in the storage chamber 121 of the tank 103 and the storage chamber 33 of the ink cartridge 30 is positioned above the position P1. On the other hand, when the signal inputted from the liquid level sensor 55 is at a high level, the control unit 130 determines that the liquid level of the ink stored in the storage chamber 121 of the tank 103 and the storage chamber 33 of the ink cartridge 30 is positioned at the position P1 or lower in the up-down direction 7. If the control unit 130 determines that the liquid level of the ink is positioned at the position P1 or lower in the up-down direction 7, the control unit 130 displays a warning that the cartridge needs to be replaced on the display, turns on the LED, or emits a buzzer sound, thereby informing the user.

The control unit 130 determines the position in the up-down direction 7 of the liquid level of the ink stored in the storage chamber 33 with respect to each of the four kind of ink cartridges 30. Further, the control unit 130 determines the position in the up-down direction 7 of the liquid level of the ink stored in the storage chamber 121 with respect to each of the four tanks 103 corresponding to the four kinds of ink cartridges 30.

The piezoelectric element 45 is connected to the ASIC 135. The piezoelectric element 45 operates when power is supplied by the control unit 130 via a drive circuit (not illustrated). The control unit 130 controls power supply to the piezoelectric element 45 and selectively ejects ink droplets from the plurality of nozzles 29.

When forming an image on the sheet 12, the control unit 130 controls the conveying motor 171 to execute an intermittent conveying process of alternately repeating conveyance of the sheet 12 by predetermined line feeds and stop of the conveyance with the conveying rollers 25 and the discharging rollers 27.

The control unit 130 executes an ejection process while the sheet 12 is stopped in the intermittent conveying process. The ejection process is a process of controlling the power supply to the piezoelectric elements 45 to eject ink droplets from the nozzles 29 while moving the carriage 22 in the left-right direction 9. That is, in the ejection process, the control unit 130 ejects ink droplets from the nozzles 29 during a single pass (hereinafter also referred to as one pass) that moves the carriage 22 from one end of the printing range to another end of the printing range. As a result, one pass worth of an image is formed on the sheet 12.

By alternately performing the intermittent conveying process and the ejection process, an image can be formed in the entire region of the sheet 12 on which the image can be formed. An image forming process is the process in which the intermittent conveying process and the ejection process are alternately executed and an image is formed on the sheet 12.

The control unit 130 performs a series of processes for forming an image on the sheet 12 by controlling each of the motors 171, 172, and 173 or the piezoelectric elements 45 according to the signals inputted from the sensors 55 and 113. The series of processes includes feeding the sheet 12 supported by the feeding tray 15 to the conveyance path 17 with the feeding roller 23, conveying the sheet 12 fed to the conveyance path 17 in the conveying direction with the conveying rollers 25 and the discharging rollers 27, forming an image on the sheet 12 conveyed through the conveyance path 17 by performing the intermittent conveying process and the ejection process, and discharging the sheet 12 on which the image is formed to the discharging tray 16 with the discharging rollers 27.

[Passage Resistance]

Here, a passage resistance value at which air flows through a passage extending from the through-hole 46 that opens to the storage chamber 32 to the air communication port 96 in an attached state of the ink cartridge 30 to the cartridge attachment portion 110 will be defined as a passage resistance value R1A. Further, a passage resistance value at which ink flows through the ink supply portion 34 will be defined as a passage resistance value R1B. Furthermore, a sum of the passage resistance value R1A and the passage resistance value R1B will be defined as a first passage resistance value R1. Further, a passage resistance value at which air flows through a passage in the tank 103 extending from the through-hole 119 of the front wall 122A of the buffer chamber 122 to the air communication port 124 will be defined as a second passage resistance value R2.

In addition, in the tank 103, a space between a horizontal plane at the position P2 including the boundary between the storage chamber 121 and the flow passage 8 in the up-down direction 7 and a horizontal plane at the position P1 is defined as a space Q. In the storage chambers 32 and 33 of the ink cartridge 30, a partial space included in the space Q is defined as a first space (an example of a first space), and an average cross-sectional area which is an average value of a plurality of cross-sectional areas taken along a plurality of horizontal planes positioned in the first space in the up-down direction 7 is defined as a first cross-sectional area S1. In the storage chamber 121 of the tank 103, a partial space included in the space Q is defined as a second space (an example of a second space), and an average cross-sectional area which is an average value of a plurality of cross-sectional areas taken along a plurality of horizontal planes positioned in the second space in the up-down direction 7 is defined as a second cross-sectional area S2. Further, a cross-sectional area ratio A is defined which is obtained by dividing the first average cross-sectional area S1 by the second average cross-sectional area S2. Here, the second passage resistance value R2 is greater than a product A×R1 obtained by multiplying the first average passage resistance value R1 by the cross-sectional area ratio A. In other words, an inequality expression of "R2>A×R1" is met.

[Operational and Technical Advantages of Present Embodiment]

When ink is supplied from the storage chamber 121 of the tank 103 to the recording portion 24 through the communication port 128 and the ink outflow port 127, the ink flows out of the storage chambers 32 and 33 of the ink cartridge 30 into the tank 103. At this time, since the second passage resistance value R2 is greater than the value A×R1 obtained by multiplying the first average passage resistance value R1 by the cross-sectional area ratio A, a lowering speed of the liquid level of the ink stored in the storage chamber 32 and the storage chamber 33 contained in the space Q is faster than a lowering speed of the liquid level of the ink stored in the storage chamber 121 of the tank 103 contained in the space Q. As a result, the storage chambers 32 and 33 on the ink cartridge 30 side run out of ink faster than the storage chamber 121 on the tank 103 side, and entry of the air via the communication port 128 of the tank 103 into the recording portion 24 is suppressed. Further, since the ink stored in the storage chambers 32 and 33 of the ink cartridge 30 is preferentially supplied to the recording portion 24, the liquid level of the ink in the storage chambers 32 and 33 of the ink cartridge 30 falls faster than that in the storage chamber 121 of the tank 103. Therefore, such determination made by the control unit 130 is suppressed that the liquid level of the ink stored in the storage chamber 121 is equal to or lower than the position P1 irrespective of the fact that the usable amount of ink still remains in the storage chamber 32 and 33.

[Variations and Modifications]

In the embodiment described above, the position in the up-down direction 7 of the horizontal plane including the boundary between the storage chamber 121 and the flow passage 123 in the up-down direction 7 is defined as the position P2, and the space between the position P1 and the position P2 is defined as the space Q. However, the space Q may be defined with the position P2 as a different position. For example, the space Q may be defined by defining a position that is lower than the boundary between the storage chamber 121 and the flow passage 123 in the up-down direction 7 and higher than the position P1 as the position P2.

Further, in the embodiment described above, the semipermeable membrane 80 closes the flow passage extending from the through-hole 46 that opens to the storage chamber 32 to the air communication port 96 in the ink cartridge 30, and the semipermeable membrane 118 closes the flow passage extending from the through-hole 119 of the front wall 122A of the buffer chamber 122 to the air communication port 124 in the tank 103. Generally, the passage resistance is determined by the various factors such as a cross-sectional area of the passage, a coefficient of friction at the surface of the passage, and a length of the passage. However, the passage resistance increased by the semipermeable membrane provided at the passage is significantly larger than the passage resistance due to these factors. Accordingly, adjustment for passage resistance value can be facilitated by disposing the semipermeable membrane at each air passage of each of the ink cartridge 30 and the tank 103, and by altering gas permeability of each semipermeable membrane, and/or by changing the cross-sectional area of each semipermeable membrane. Still however, the semipermeable membrane is not necessarily provided at each air passage as long as the inequality expression of R2>A×R1 is met by setting the first passage resistance value R1 and the second passage resistance value R2 depending on cross-sectional areas and the lengths of the air passage and ink passage and by setting the first average cross-sectional area S1 and the second average cross-sectional area S2.

Further, in the embodiment described above, the semipermeable membrane 80 is provided in the ink cartridge 30. However, the semipermeable membrane 80 is not necessarily provided in the ink cartridge 30. For example, the semipermeable membrane 80 may be provided at any position of the air passage extending from the outside to the storage chamber 32 in the attached state of the ink cartridge 30 to the cartridge attachment portion 110. Specifically, the semipermeable membrane 80 may be provided in the air passage in communication with the internal space of the rod 125 of the cartridge attachment portion 110, in a case where the air passage is provided in the internal space of the rod 125 of the cartridge attachment portion 110 and the air communication port 96 of the ink cartridge 30 is in communication with the internal space of the rod 125 to constitute the air passage in the attached state of the ink cartridge 30 to the cartridge attachment portion 110.

Further, the ink supply port 71 may be sealed with a film instead of the valve 77. Further, the ink supply port 71 may be formed by puncturing a needle in a seal member such as an elastic resin having no through-hole, and when the needle is extracted from the seal member, the ink supply port 71 may be sealed by elasticity of the seal member. Furthermore, the ink supply portion 34 does not need to be achieved as a cylindrical member, and for example, a through-hole formed in the front wall 41 of the casing 31 may be configured as a supply portion.

Further, in the embodiment described above, the control unit 130 determines that the liquid level of the ink stored in the storage chamber 121 of the tank 103 and the storage chamber 33 of the ink cartridge 30 is positioned at the position P1 or lower in the up-down direction 7 under the condition that the input signal from the liquid level sensor 55 changes from the low-level signal to the high-level signal due to the state change of the pivoting member 50.

However, the control unit 130 may determine that the liquid level of the ink stored in the storage chamber 121 of the tank 103 and the storage chamber 33 of the ink cartridge 30 is positioned at the position P1 or lower in the up-down direction 7 under conditions other than the condition described above.

For example, the control unit 130 may count the number of dots of ink droplets ejected from the recording head 21 after the input signal outputted from the liquid level sensor 55 changes from the low-level signal to the high-level signal due to the state change of the pivoting member 50. Further, the control unit 130 may determine that the liquid level of the ink stored in the storage chamber 121 of the tank 103 and the storage chamber 33 of the ink cartridge 30 is positioned at a predetermined position lower than the position P1 in the up-down direction 7 under condition that the dot count value is equal to or more than a predetermined value. Further, the predetermined value is determined on the basis of the internal volume of the storage chamber 121 below the connecting portion 107.

In the embodiment described above, the attachment sensor 113 and the liquid level sensor 55 are optical sensors each having a light-emitting element and a light-receiving element. However, the attachment sensor 113 and the liquid level sensor 55 may be sensors of a type different from the optical sensor, such as a proximity sensor.

In the embodiment described above, the liquid level of the ink stored in the storage chamber 121 becoming lower than the position P1 was detected on the basis of pivoting of the pivoting member 50 disposed in the storage chamber 121 of each tank 103. However, the detection may be performed by methods other than pivoting of the pivoting member 50.

For example, a prism may be disposed at the same height as the position P1 in the storage chamber 121 of each tank 103. On the basis of facts that the traveling direction of the light incident on the prism is different depending on whether or not the liquid level of the ink stored in the storage chamber 121 is higher than the prism, it may be detected whether or not the liquid level of the ink stored in the storage chamber 121 is equal to or lower than the position P1.

Further, for example, two electrodes may be disposed in the storage chamber 121 of each tank 103. The lower end of one of the two electrodes may be at a position slightly higher than the position P1, whereas the lower end of the other of the two electrodes may be located below the position P1. Thus, it may be detected whether or not the liquid level of the ink stored in the storage chamber 121 is equal to or lower than the position P1 according to whether or not the current flows between the two electrodes through the ink.

Further, each of the above-described detecting portions such as the pivoting member 50, the liquid level sensor 50, and the like may be provided in the storage chambers 32 and 33 of the ink cartridge 30 instead of the tank 103.

In the embodiment described above, both of the connecting portion 107 of the cartridge attachment portion 110 and the ink supply portion 34 of the ink cartridge 30 extend in the horizontal direction. Further, the ink cartridge 30 is attached to the cartridge attachment portion 110 by being inserted into the cartridge attachment portion 110 in the horizontal direction. At this time, the connecting portion 107 and the ink supply portion 34 are connected to each other in the horizontal direction. However, the ink cartridge 30 may be attached to the cartridge attachment portion 110 by being inserted into the cartridge attachment portion 110 in a direction other than the horizontal direction, for example, in the up-down direction 7.

In this case, for example, the connecting portion 107 protrudes upward from the cartridge case 101. Further, the ink supply portion 34 protrudes downward from the bottom wall of the ink cartridge 30. Note that, in this case, the position P1 is set, for example, at the center position of the connecting portion 107 in the up-down direction 7 or the center position of the ink supply portion 34 in the up-down direction 7.

In the embodiment described above, the ink is described as an example of a liquid. However, instead of the ink, for example, a pretreatment liquid emitted onto the sheet prior to the ink at the time of image forming may be stored in the ink cartridge 30 and the tank 103. Further, water for cleaning the recording head 21 may be stored in the ink cartridge 30 and the tank 103.

What is claimed is:

[1. An image forming apparatus comprising:

a cartridge comprising:

a first storage chamber configured to store a liquid;

a first air communication portion allowing the first storage chamber to be communicated with an atmosphere;

a supply portion configured to supply the liquid stored in the first storage chamber; and a first semipermeable membrane blocking the first air communication portion against a flow of the liquid;

a cartridge attachment portion comprising:

a connecting portion connectable to the supply portion; and a tank comprising:

a liquid flow-in port allowing the liquid stored in the first storage chamber and flowing through the connecting portion connected to the supply portion to pass through the liquid flow-in port;

a second storage chamber configured to store the liquid passed through the liquid flow-in port;

a second air communication portion allowing the second storage chamber to be communicated with the atmosphere;

a second semipermeable membrane blocking the second air communication portion against the flow of the liquid; and a liquid flow-out port disposed at a position below the liquid flow-in port and allowing the liquid stored in the storage chamber to flow out of the second storage chamber; and a recording portion comprising a nozzle through which the liquid flowed out of the second storage chamber through the liquid flow-out port is ejected.]

2. The image forming [apparatus] *system* according to claim [1] *7*, wherein the second storage chamber includes a first portion, and a second portion positioned above the first portion and having a cross-sectional area smaller than that of the first portion.

[3. The image forming apparatus according to claim 1, further comprising;

a detecting portion configured to detect a level of the liquid stored in the second storage chamber and at a position adjacent to the connecting portion, the detecting portion being further configured to output a detection signal; and a controller configured to:

determine non-existence of the liquid in the first storage chamber according to the detection signal outputted from the detecting portion; and notify a user of a replacement of the cartridge with a new cartridge.]

4. The image forming [apparatus] *system* according to claim [1] *7*, wherein the liquid flow-out port is positioned below the supply portion in a direction of gravity.

5. The image forming [apparatus] *system* according to claim [1] *7*, wherein the supply portion comprises a liquid passage, wherein the image forming apparatus further comprises a valve provided in the supply portion to open and close the liquid passage, and wherein the connecting portion comprises a tubular member in abutment with the valve to enter the liquid passage providing communication between the liquid passage and an internal space of the tubular member.

6. The image forming [apparatus] *system* according to claim 5, wherein the tubular member extends in a horizontal direction.

7. An image forming system comprising:

a cartridge comprising:

a first storage chamber configured to store a liquid;

a first air communication portion allowing the first storage chamber to be communicated with an atmosphere;

a supply portion configured to supply the liquid stored in the first storage chamber; and a first semipermeable membrane blocking the first air communication portion against a flow of the liquid; and an image forming apparatus comprising:

a cartridge attachment portion comprising:

a connecting portion connectable to the supply portion; and a tank comprising:

a liquid flow-in port allowing the liquid stored in the first storage chamber and flowing through the connecting portion connected to the supply portion to pass through the liquid flow-in port;

a second storage chamber configured to store the liquid passed through the liquid flow-in port;

a second air communication portion allowing the second storage chamber to be communicated with the atmosphere;

a second semipermeable membrane blocking the second air communication portion against the flow out of the liquid; and a liquid flow-out port disposed at a position below the liquid flow-in port and allowing the liquid stored in the storage chamber to flow out of the second storage chamber; and a recording portion comprising a nozzle through which the liquid flowed out of the second storage chamber through the liquid flow-out port is ejected,

*wherein the image forming apparatus further comprises:*

*a detecting portion configured to detect a level of the liquid stored in the second storage chamber and at a position adjacent to the connecting portion, the detecting portion being further configured to output a detection signal; and*

*a controller configured to:*

*determine non-existence of the liquid in the first storage chamber according to the detection signal outputted from the detecting portion; and*

*notify a user of a replacement of the cartridge with a new cartridge.*

*8. An image forming system comprising:*

*a first storage chamber configured to store a liquid;*

*a first air communication portion allowing the first storage chamber to be communicated with an atmosphere;*

*a first supply portion configured to supply the liquid stored in the first storage chamber;*

*a second storage chamber configured to store the liquid supplied from the first supply portion;*

*a second air communication portion allowing the second storage chamber to be communicated with the atmosphere;*

*a second supply portion configured to supply the liquid stored in the second storage chamber; and*

*a recording portion comprising a nozzle through which the liquid supplied from the second storage chamber is ejected,*

*wherein an inequality expression of "R2>A×R1" is met, in which*

*R1: a first passage resistance value which is a sum of a passage resistance value obtained by flowing air through the first air communication portion and a passage resistance value obtained by flowing liquid through the first supply portion;*

*R2: a second passage resistance value obtained by flowing air through the second air communication portion; and*

*A: a cross-sectional area ratio obtained by dividing a first average cross-sectional area by a second average cross-sectional area, the first average cross-sectional area being an average cross-sectional area of a first space of the first storage chamber taken along a plurality of horizontal planes, the first space containing at least a portion adjacent to the first supply portion and accumulating the liquid; and the second average cross-sectional area being an average cross-sectional area of a second space of the second storage chamber taken along the plurality of horizontal planes, the second space containing at least a portion accumulating the liquid.*

*9. The image forming system according to claim 8, further comprising:*

*a first semipermeable membrane blocking the first air communication portion against a flow of the liquid.*

*10. The image forming system according to claim 8, further comprising:*

*a second semipermeable membrane blocking the second air communication portion against a flow of the liquid.*

*11. The image forming system according to claim 8, wherein the second supply portion is positioned below the first supply portion in a direction of gravity.*

* * * * *